(12) United States Patent
Bulkowski et al.

(10) Patent No.: US 9,201,742 B2
(45) Date of Patent: Dec. 1, 2015

(54) METHOD AND SYSTEM OF SELF-MANAGING NODES OF A DISTRIBUTED DATABASE CLUSTER WITH A CONSENSUS ALGORITHM

(71) Applicants: Brian J. Bulkowski, Menlo Park, CA (US); Venkatachary Srinivasan, Sunnyvale, CA (US)

(72) Inventors: Brian J. Bulkowski, Menlo Park, CA (US); Venkatachary Srinivasan, Sunnyvale, CA (US)

( * ) Notice: Subject to any disclaimer, the term of this patent is extended or adjusted under 35 U.S.C. 154(b) by 0 days.

(21) Appl. No.: 14/508,785

(22) Filed: Oct. 7, 2014

(65) Prior Publication Data

US 2015/0161016 A1 Jun. 11, 2015

Related U.S. Application Data

(63) Continuation-in-part of application No. 14/299,566, filed on Jun. 9, 2014, now Pat. No. 9,002,871, which is a continuation-in-part of application No. 13/451,551, filed on Apr. 20, 2012, now Pat. No. 8,799,248.

(60) Provisional application No. 61/478,940, filed on Apr. 26, 2011.

(51) Int. Cl.
*G06F 17/30* (2006.01)
*G06F 11/18* (2006.01)

(52) U.S. Cl.
CPC ........ *G06F 11/183* (2013.01); *G06F 17/30584* (2013.01)

(58) Field of Classification Search
CPC ............... G06F 17/30654; G06F 17/30911; G06F 17/30946; Y10S 707/966; Y10S 707/99934
USPC .................................. 707/711, 763
See application file for complete search history.

(56) References Cited

U.S. PATENT DOCUMENTS

| 7,334,152 B2 * | 2/2008 | Morigaki ................. 713/503 |
| 8,799,248 B2 * | 8/2014 | Bulkowski et al. ........... 707/703 |
| 9,002,871 B2 * | 4/2015 | Bulkowski et al. ........... 707/763 |
| 2006/0136781 A1 * | 6/2006 | Lamport ................. 714/25 |

* cited by examiner

*Primary Examiner* — Cheryl Lewis

(57) ABSTRACT

In one exemplary aspect, a method of a distributed database system includes the step of detecting that a database node departed from a database cluster. A consensus-based voting process is implemented utilizing all of a set of other database nodes remaining in the database cluster. A cluster configuration is determined with the consensus-based voting process. The cluster configuration includes a new list of the set of other database nodes remaining in the database cluster. The data is automatically rebalanced among the set of other database nodes remaining in the database cluster according to the cluster configuration. Optionally, the consensus-based voting process can include a Paxos algorithm. The database cluster can be a Not-Only SQL (NOSQL) distributed database cluster.

17 Claims, 5 Drawing Sheets

METHOD AND SYSTEM OF SELF-MANAGING NODES OF A DISTRIBUTED DATABASE CLUSTER WITH A CONSENSUS ALGORITHM

CROSS-REFERENCE TO RELATED APPLICATIONS

This application incorporates by reference the following U.S. patent applications: U.S. patent application Ser. No. 14/299,566, titled METHOD AND SYSTEM OF MAPREDUCE IMPLEMENTATIONS ON INDEXED DATASETS IN A DISTRIBUTED DATABASE ENVIRONMENT and filed on Jun. 9, 2014, now U.S. Pat. No. 9,002,871; U.S. patent application Ser. No. 13/653,411, titled METHOD AND SYSTEM OF MAPREDUCE IMPLEMENTATIONS ON INDEXED filed on Oct. 17, 2012, now U.S. Pat. No. 8,775,464; U.S. application Ser. No. 13/451,551, titled REAL-TIME TRANSACTION SCHEDULING IN A DISTRIBUTED DATABASE and filed Apr. 20, 2012, now U.S. Pat. No. 8,799,248; and U.S. Provisional Application No. 61/478,940, titled DISTRIBUTED DATABASE SYSTEM WITH A CLUSTER OF AUTONOMOUS NODES and filed Apr. 26, 2011. These applications are hereby incorporated by reference in their entirety.

BACKGROUND

1. Field

This application relates generally to data storage, and more specifically to a system, article of manufacture and method of self-managing nodes of a distributed database cluster with a consensus algorithm.

2. Related Art

A distributed database can include a plurality of database nodes and associated data storage devices. A database node can manage a data storage device. If the database node goes offline, access to the data storage device can also go offline. Accordingly, redundancy of data can be maintained. However, maintaining data redundancy can have overhead costs and slow the speed of the database system. Additionally, offline data may need to be rebuilt (e.g. after the failure of the database node and subsequent rebalancing operations). This process can also incur a time and processing cost for the database system. Therefore, methods and systems of self-managing nodes of a distributed database cluster with a consensus algorithms can provide improvements to the management of distributed databases.

BRIEF SUMMARY OF THE INVENTION

In one aspect, a method of a distributed database system includes the step of detecting that a database node departed from a database cluster. A consensus-based voting process is implemented utilizing all of a set of other database nodes remaining in the database cluster. A cluster configuration is determined with the consensus-based voting process. The cluster configuration includes a new list of the set of other database nodes remaining in the database cluster. The data is automatically rebalanced among the set of other database nodes remaining in the database cluster according to the cluster configuration.

Optionally, the consensus-based voting process can include a Paxos algorithm. The database cluster can be a Not-Only SQL (NOSQL) distributed database cluster. A principal node can be automatically elected with votes by all members of the set of other database nodes remaining in the database cluster. A multi-phase commit process can be utilized with the principal database node to determine the state of the set of other database nodes. The principal node can communicate a request to the other members of the set of other database nodes to return a commit transaction back to the principal node. A commit transaction can be detected in response to the principal database node's request from the other members of the set of other database nodes. Each database node that communicates the commit transactions can be included in a new database cluster. The Paxos algorithm can be used to generate a list member nodes of the new database cluster. A set of instructions for the consensus-based voting process can be present in each database node of the database cluster.

BRIEF DESCRIPTION OF THE DRAWINGS

The present application can be best understood by reference to the following description taken in conjunction with the accompanying figures, in which like parts may be referred to by like numerals.

Figure 1:
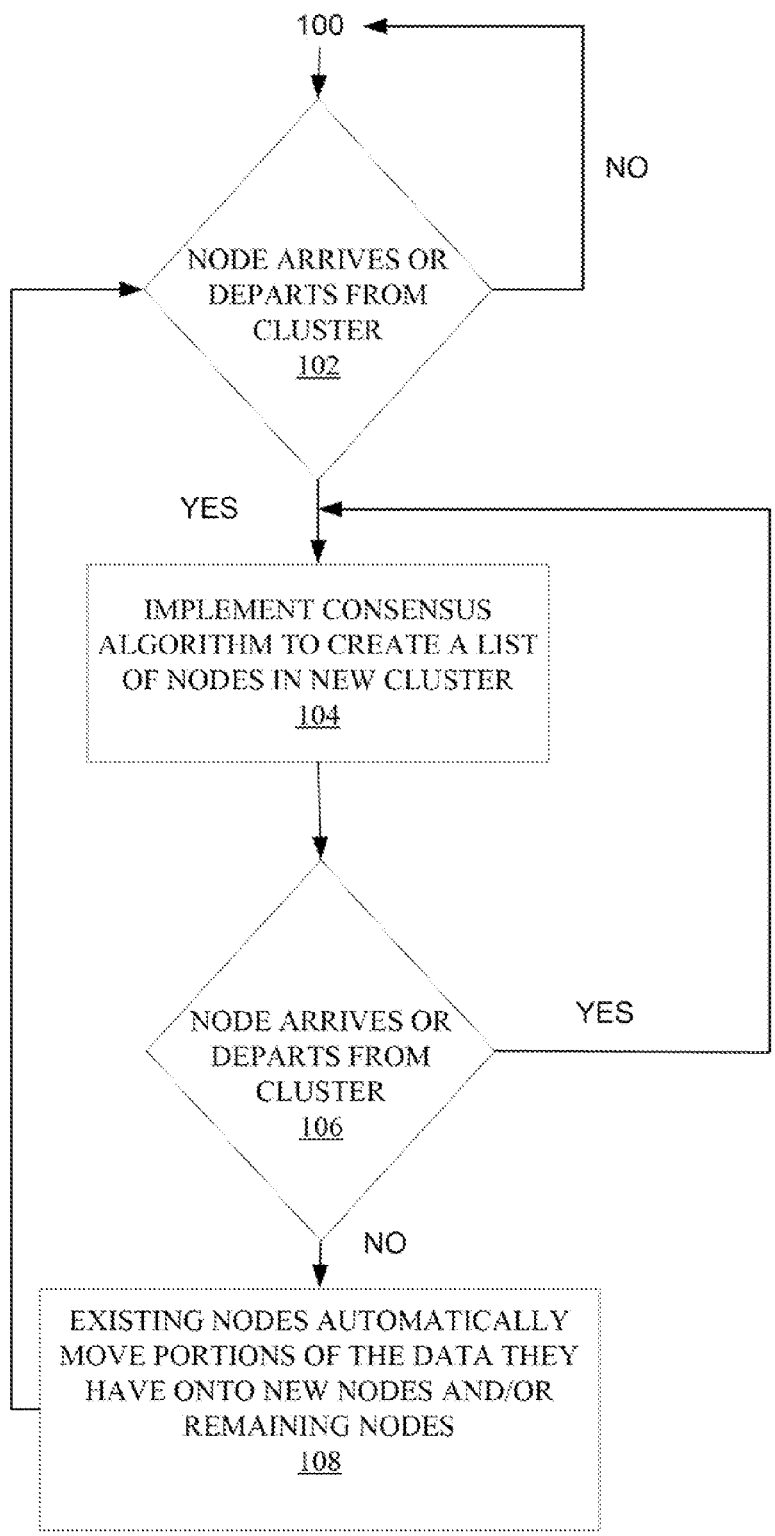
FIG. 1 illustrates an exemplary process for self-managing nodes of a distributed database cluster, according to some embodiments.

The Figures described above are a representative set, and are not an exhaustive with respect to embodying the invention.

DETAILED DESCRIPTION

Disclosed are a system, method, and article of manufacture for self-managing nodes of a distributed database cluster with a consensus algorithm. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principals defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates an exemplary process for self-managing nodes of a distributed database cluster. In step 102 of process 100, it is determined if one or more nodes have arrived or departed from the cluster. In an example embodiment, step 102 can be performed with various mechanisms for determining node arrival to and departure from the cluster such as a multicast discovery protocol and/or a script interface for integration with external management systems. Each database node can include a persistent and unique identifier that the node periodically transmits to a 'heartbeat' address. Each node then monitors the received heartbeat transmissions from the other member nodes in the cluster to automatically detect when a new database node has come into service or when an existing database node has failed. A database node can be determined to have failed when its 'heartbeat' stops (i.e. the heartbeat transmission fails to arrive within a specified period) and/or when transactions involving that database node are faulty according to a specified tolerance parameter.

If the remaining nodes determine that one or more nodes have arrived or departed from the cluster, step 104 then implements a consensus algorithm (e.g. a Paxos algorithm) to create a list of new nodes in a reconfigured cluster. In one example, the remaining database nodes can implement a consensus-based voting process (e.g. a Paxos algorithm). A Paxos algorithm (e.g. a Basic Paxos algorithm, Multi-Paxos algorithm, Cheap Paxos algorithm, Fast Paxos algorithm, Generalized Paxos algorithm, Byzantine Paxos algorithm, etc.) can include a family of protocols for solving consensus in a network of unreliable nodes. Consensus can be the process of agreeing on one result among a group of participants (e.g. database nodes in a distributed NoSQL database).

In one example embodiment, the remaining nodes can implement a consensus-based voting process. The instructions for the consensus-based voting process exist in each node of the cluster. Once a new list of extant nodes is created by the consensus-voting process, the existing nodes in the cluster can then automatically copy or move portions of the data they have onto the new nodes or the remaining nodes in order to rebalance the data across all the existing cluster nodes (see step 108).

In an example embodiment, a modified Paxos algorithm can be utilized as the consensus-voting process. For example, a principal node can be elected. The principal node can then utilize a multi-phase commit process to determine the state of the nodes. If another node provides a commit in response to the principal node's request, then it can be included in the new cluster. In such an example, it should be noted that the modified Paxos algorithm is used to generate a list member nodes of the new cluster. In this particular example, the remaining steps of reconfiguring the new cluster (such as synchronizing data between nodes and/or partitioning data among nodes) can be performed by another step (such as step 108) that does not use the Paxos algorithm. For three or more nodes, typically, the Paxos algorithm defines a quorum as a family of subsets of the set of acceptor nodes such that any two subsets from the family (that is, any two quorums) have a non-empty intersection. A quorum can be any majority of participating acceptor nodes. For example, given the set of acceptor nodes {A,B,C,D}, a majority quorum would be any three acceptor nodes: {A,B,C}, {A,C,D}, {A,B,D}, {B,C,D}. However, the Paxos algorithm of the example embodiment can be modified in order to proceed with one or two extant nodes. For example, if only one node remains, than the single node forms the new cluster with a quorum of one for implementation of the Paxos algorithm. If two nodes remain, then the two nodes can form a quorum for implementation of the Paxos algorithm.

In step 106, it is again determined if one or more nodes have arrived or departed from the cluster. If step 106 returns a positive response then process 100 returns to step 104. If step 106 returns a negative response, process 100 continues to step 108. In step 108, remaining nodes automatically move or copy portions of the data (and, in some embodiments, metadata about the data) to the new nodes or the remaining nodes (i.e. with a data rebalancing operation). In one embodiment, metadata (e.g. a namespace directory of the data in the cluster) can be maintained in each node of the cluster. Thus, each node of the cluster has access to the previous state of cluster and thus determines a current location of data. An automatic data rebalancing process can then be implemented to determine how data should be distributed in the new cluster configuration following one or more data migration techniques such as process 400. The attributes of the data rebalancing process can vary according to such factors as the particular replication factor (how many copies of a piece of data are maintained) of the cluster. The process can then return to step 102.

In one example, the nodes in a NOSQL distributed database system can participate in a Paxos distributed consensus algorithm, which is used to ensure agreement on a minimal amount of critical shared state. The shared state can include a list of nodes that are participating in the database cluster. Consequently, when a node arrives and/or departs, the consensus algorithm can run to ensure that an agreement is reached. After consensus is achieved, each individual node can agree on both the participants and their order within the cluster. Using this information a master node for any transaction can be computed along with the replica nodes. Since the essential information about any transaction can be computed, transactions can be simpler and use various database algorithms. This can result in minimal latency transactions which involve a minimal subset of nodes. The contents of a namespace can also be partitioned by key value and the associated values can be spread across every node in the cluster. Once a node has been added to and/or removed from a cluster, data rebalancing can start immediately after a cluster change is detected. The automatic data rebalancing can be conducted across the internal cluster interconnect. Balanced data can ensure that the query volume is distributed evenly across all nodes, and the cluster is resilient in the event of node failure happening during rebalancing itself. This can provide scalability in both performance and capacity can be achieved entirely horizontally. Furthermore, the system is designed to be continuously available, so data rebalancing doesn't impact cluster behavior. If a cluster node receives a request for a piece of data that it does not have locally, it can satisfy the request by creating an internal proxy for this request, fetching the data from the real owner using the internal cluster interconnect, and subsequently replying to the client directly.

It is noted that the Paxos-consensus algorithm can be implemented as a high speed distributed consensus algorithm, in some embodiments. For example, once the cluster change is discovered, all surviving nodes use a Paxos-like consensus voting process to determine which nodes form the cluster and a hashing algorithm (e.g. Aerospike Smart Partitions™ algorithm) to automatically re-allocate partitions and re-balance. The hashing algorithm can be deterministic (e.g. it always maps a given record to the same partition). Data records can stay in the same partition for their entire life although partitions may move from one server to another. All of the nodes in the distributed database system can participate in a Paxos distributed consensus algorithm, which can be used to ensure agreement on a minimal amount of critical shared state. In one example, all cluster nodes can be required to agree, not a simple majority. Additionally, in one example, Paxos algorithms can only be used for cluster configuration, not transaction commit.

Figure 2:
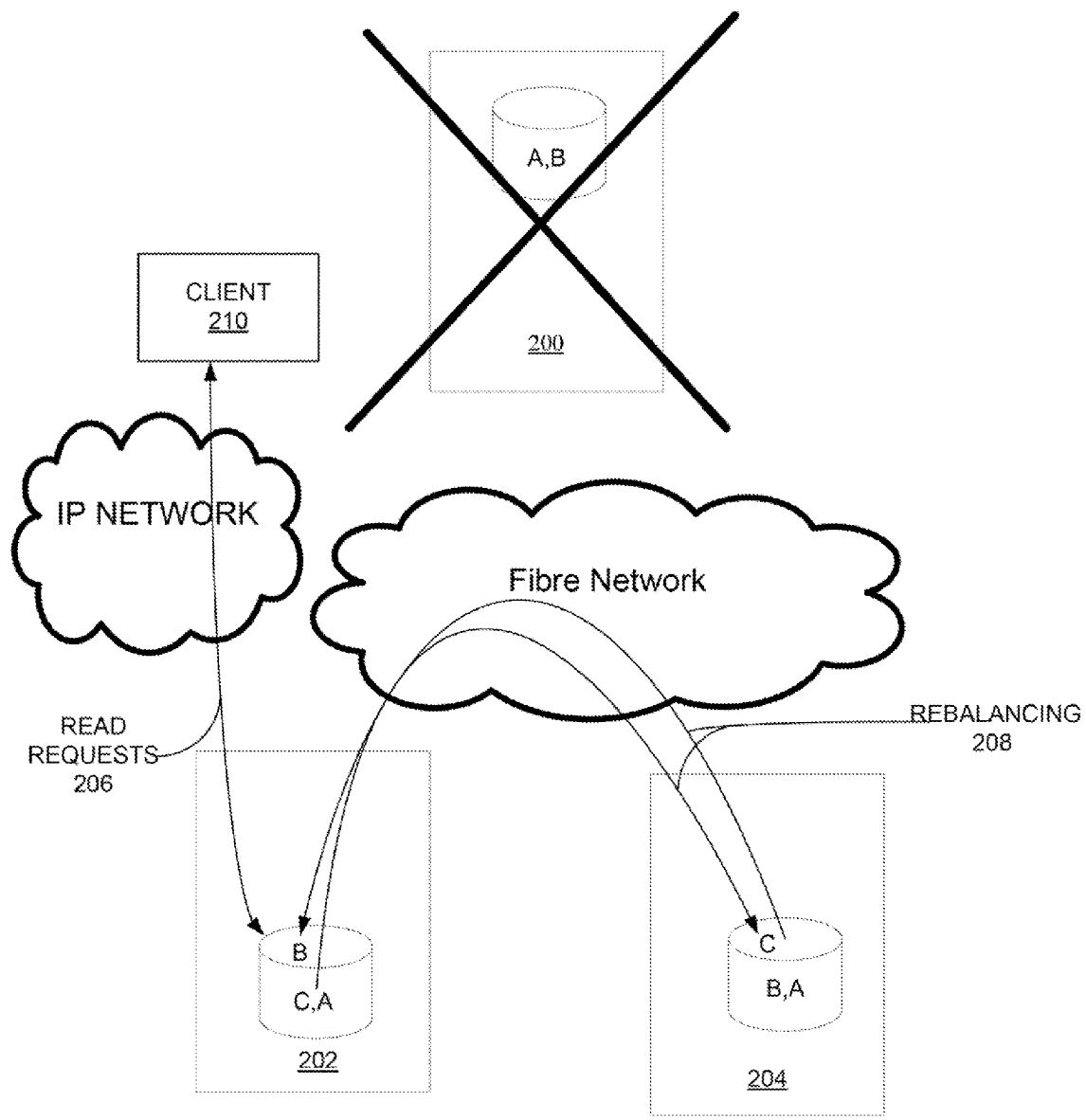
FIG. 2 illustrates an example application of the self-managing nodes, according to some embodiments.

FIG. 2 illustrates an example application of the self-managing nodes of FIG. 1. FIG. 2 depicts a cluster originally comprising nodes 200, 202 and 204. Node 200 fails and is dropped from the cluster configuration. Nodes 202 and 204 then implement the steps and operations of FIG. 1 to autonomously reconfigure the cluster (e.g. into a new 'Paxos state'). For example, node 202 can initiate an operation with node 204 to use a Paxos algorithm to create a new list of member nodes of the cluster. Node 202 can automatically share metadata about data sets A and C with node 204. Node 204 can automatically share metadata about data sets B, A with node 202. Consequently, nodes 202 and 204 begin such operations as data rebalancing. Node 202 can then move data set C to node 204 and node 204 can move data set B to node 202.

Figure 3:
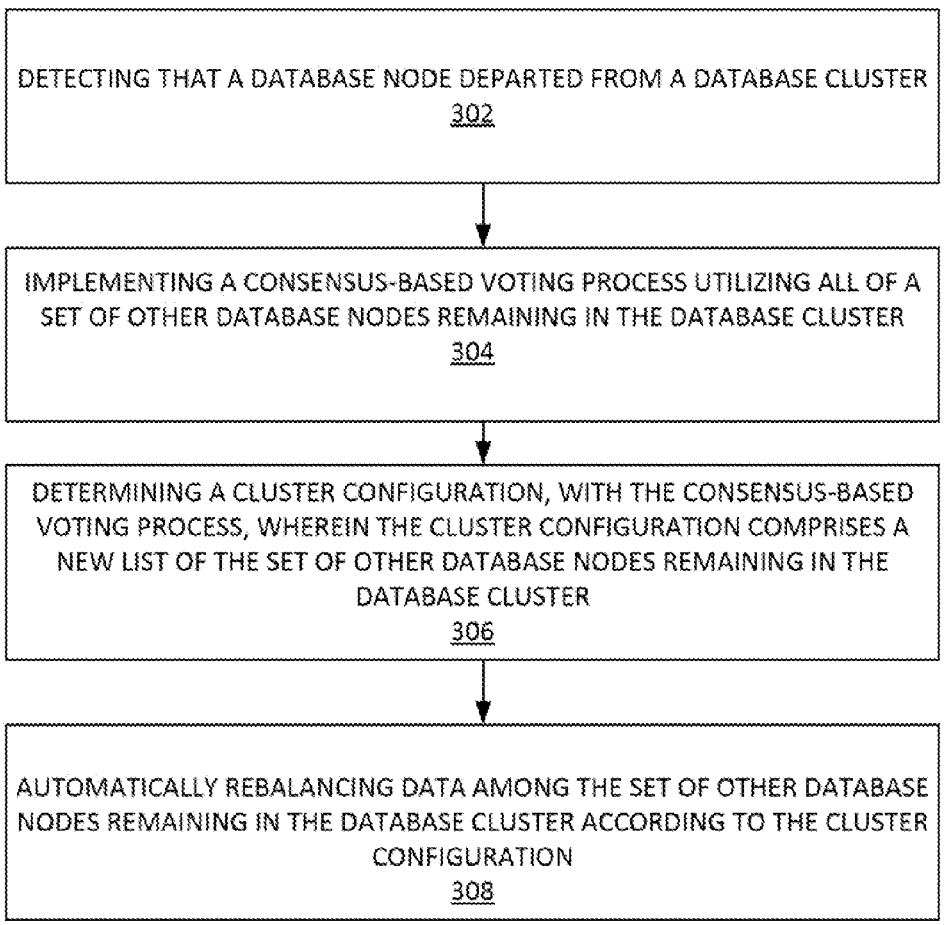
FIG. 3 illustrates an example process a distributed database system that can be implemented according to some embodiments.

FIG. 3 illustrates an example process 300 a distributed database system that can be implemented according to some embodiments. Step 302 can include detecting that a database node departed from a database cluster. In step 304 a consensus-based voting process is implemented utilizing all of a set of other database nodes remaining in the database cluster. In step 306 a cluster configuration is determined with the consensus-based voting process. The cluster configuration can include a new list of the set of other database nodes remaining in the database cluster. In step 308, the data is automatically rebalanced among the set of other database nodes remaining in the database cluster according to the cluster configuration. The consensus-based voting process can include a Paxos algorithm. The database cluster can be a Not-Only SQL (NOSQL) distributed database cluster. A principal node can be automatically elected with votes by all members of the set of other database nodes remaining in the database cluster. A multi-phase commit process can be utilized with the principal database node to determine the state of the set of other database nodes. The principal node can communicate a request to the other members of the set of other database nodes to return a commit transaction back to the principal node. A commit transaction can be detected in response to the principal database node's request from the other members of the set of other database nodes. Each database node that communicates the commit transactions can be included in a new database cluster. The Paxos algorithm can be used to generate a list member nodes of the new database cluster. A set of instructions for the consensus-based voting process can be present in each database node of the database cluster.

Figure 4:
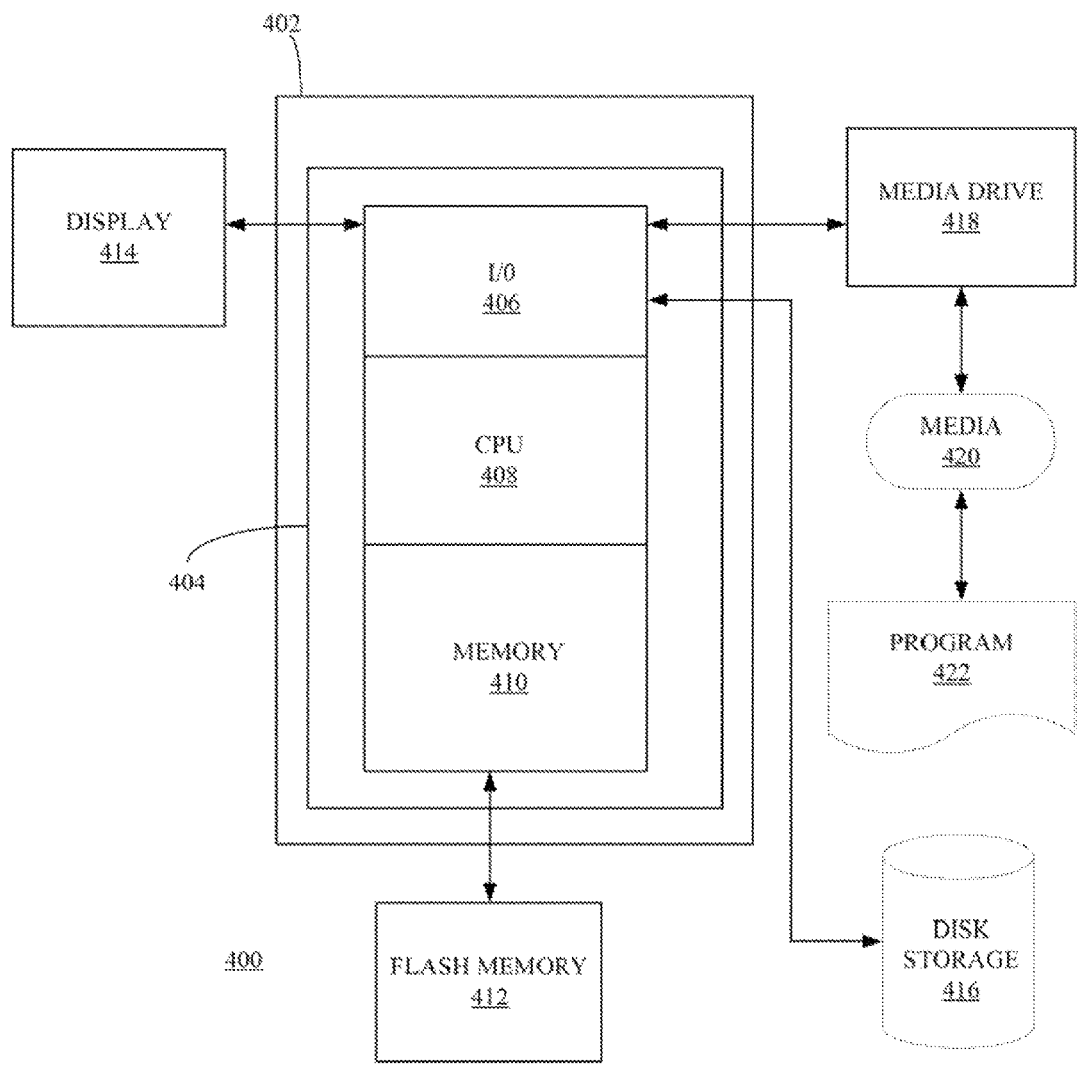
FIG. 4 is a block diagram of a sample computing environment that can be utilized to implement some embodiments.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can include programs 422 and/or data. Computing system 400 can include a web browser. Moreover, it is noted that computing system 400 can be configured as a NoSQL distributed database server with a solid-state drive (SSD).

Figure 5:
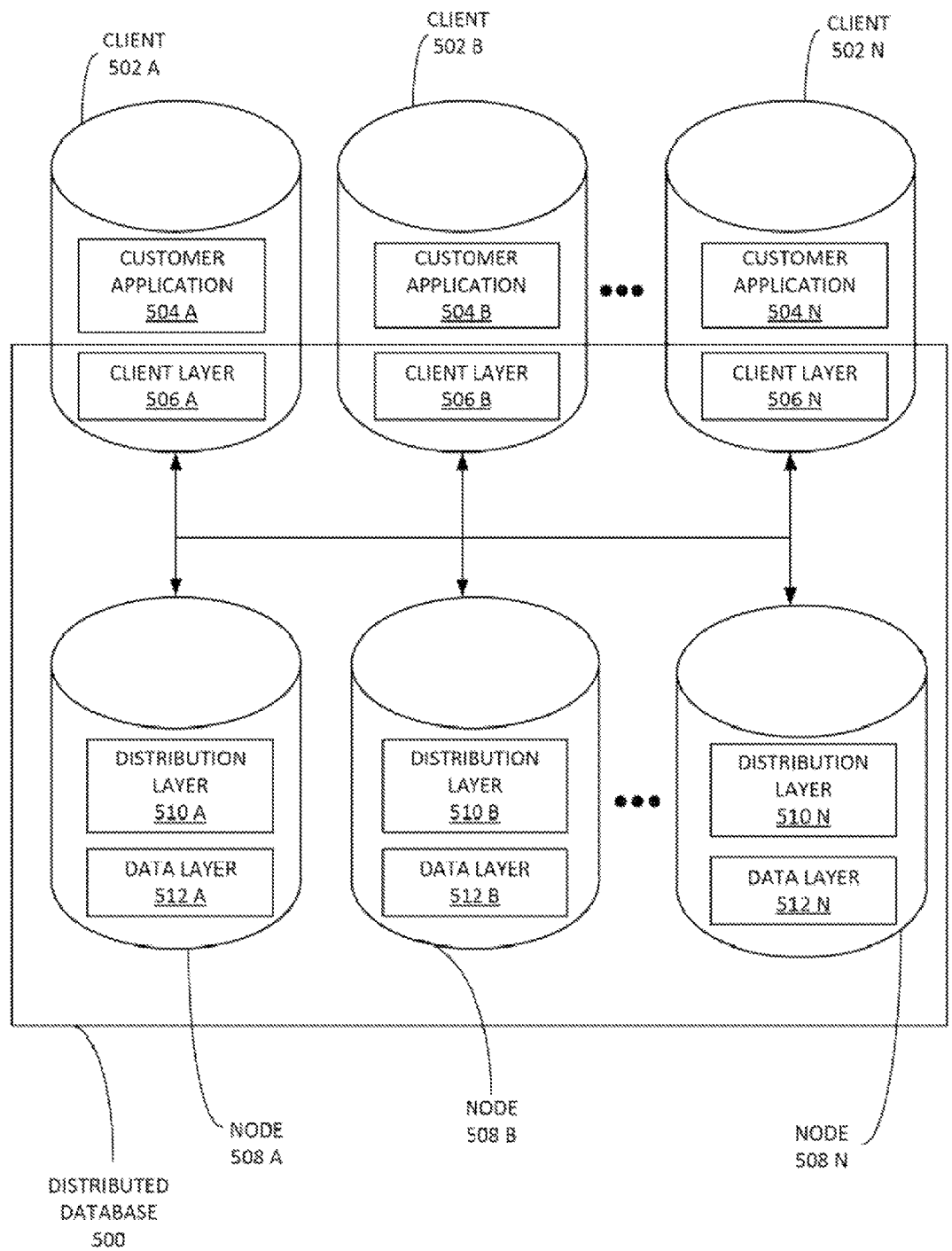
FIG. 5 shows, in a block diagram format, a distributed database system (DDBS) operating in a computer network according to an example embodiment.

FIG. 5 shows, in a block diagram format, a distributed database system (DDBS) 500 operating in a computer network according to an example embodiment. In some examples, DDBS 500 can be an Aerospike® database. DDBS 500 can typically be a collection of databases that can be stored at different computer network sites (e.g. a server node). Each database may involve different database management systems and different architectures that distribute the execution of transactions. DDBS 500 can be managed in such a way that it appears to the user as a centralized database. It is noted that the entities of distributed database system (DDBS) 500 can be functionally connected with a PCIe interconnections (e.g. PCIe-based switches, PCIe communication standards between various machines, bridges such as non-transparent bridges, etc.). In some examples, some paths between entities can be implemented with Transmission Control Protocol (TCP), remote direct memory access (RDMA) and the like.

DDBS 500 can be a distributed, scalable NoSQL database, according to some embodiments. DDBS 500 can include, inter alia, three main layers: a client layer 506 A-N, a distribution layer 510 A-N and/or a data layer 512 A-N. Client layer 506 A-N can include various DDBS client libraries. Client layer 506 A-N can be implemented as a smart client. For example, client layer 506 A-N can implement a set of DDBS application program interfaces (APIs) that are exposed to a transaction request. Additionally, client layer 506 A-N can also track cluster configuration and manage the transaction requests, making any change in cluster membership completely transparent to customer application 504 A-N.

Distribution layer 510 A-N can be implemented as one or more server cluster nodes 508 A-N. Cluster nodes 508 A-N can communicate to ensure data consistency and replication across the cluster. Distribution layer 510 A-N can use a shared-nothing architecture. The shared-nothing architecture can be linearly scalable. Distribution layer 510 A-N can perform operations to ensure database properties that lead to the consistency and reliability of the DDBS 500. These properties can include Atomicity, Consistency, isolation, and Durability.

Atomicity.

A transaction is treated as a unit of operation. For example, in the case of a crash, the system should complete the remainder of the transaction, or it may undo all the actions pertaining to this transaction. Should a transaction fail, changes that were made to the database by it are undone (e.g. rollback).

Consistency.

This property deals with maintaining consistent data in a database system. A transaction can transform the database from one consistent state to another. Consistency falls under the subject of concurrency control.

Isolation.

Each transaction should carry out its work independently of any other transaction that may occur at the same time.

Durability.

This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

In addition, distribution layer 510 A-N can ensure that the cluster remains fully operational when individual server nodes are removed from or added to the cluster. On each server node, a data layer 512 A-N can manage stored data on disk. Data layer 512 A-N can maintain indices corresponding to the data in the node. Furthermore, data layer 512 A-N be optimized for operational efficiency, for example, indices can be stored in a very tight format to reduce memory requirements, the system can be configured to use low level access to the physical storage media to further improve performance and the likes. It is noted, that in some embodiments, no additional cluster management servers and/or proxies need be set up and maintained other than those depicted in FIG. 5.

In some embodiments, cluster nodes 508 A-N can be an Aerospike Smart Cluster™. Cluster nodes 508 A-N can have a shared-nothing architecture (e.g. there is no single point of failure (SPOF)). Every node in the cluster can be substantially identical. For example, cluster nodes 508 A-N can start with a few nodes and then be scaled up by adding additional hardware. Cluster nodes 508 A-N can scale linearly. Data can be distributed across cluster nodes 508 A-N can using randomized key hashing (e.g. no hot spots, just balanced load). Nodes can be added and/or removed from cluster nodes 508 A-N can without affecting user response time (e.g. nodes rebalance among themselves automatically). A Paxos algorithm can be implemented such that all cluster nodes agree to a new cluster state. Paxos algorithms can be implemented for cluster configuration and not transaction commit.

Auto-Discovery.

Multiple independent paths can be used for nodes discovery—an explicit heartbeat message and/or via other kinds of traffic sent to each other using the internal cluster inter-connects. The discovery algorithms can avoid mistaken removal of nodes during temporary congestion. Failures along multiple independent paths ca be used to ensure high confidence in the event. Sometimes nodes can depart and then join again in a relatively short amount of time (e.g. with router glitches). DDBS 500 can avoid race conditions by enforcing the order of arrival and departure events.

Balanced Distribution.

Once consensus is achieved and each node agrees on both the participants and their order within the cluster, a partitions algorithm (e.g. Aerospike Smart Partitions™ algorithm) can be used to calculate the master and replica nodes for any transaction. The partitions algorithm can ensure no hot spots and/or query volume is distributed evenly across all nodes. DDBS 500 can scale without a master and eliminates the need for additional configuration that is required in a sharded environment.

Synchronous Replication.

The replication factor can be configurable. For example, a deployments use a replication factor of two (2). The cluster can be rack-aware and/or replicas are distributed across racks to ensure availability in the case of rack failures. For writes with immediate consistency, writes are propagated to all replicas before committing the data and returning the result to the client. When a cluster is recovering from being partitioned, the system can be configured to automatically resolve conflicts between different copies of data using timestamps. Alternatively, both copies of the data can be returned to the application for resolution at that higher level. In some cases, when the replication factor can't be satisfied, the cluster can be configured to either decrease the replication factor and retain all data, or begin evicting the oldest data that is marked as disposable. If the cluster can't accept any more data, it can begin operating in a read-only mode until new capacity becomes available, at which point it can automatically begin accepting application writes.

Self-Healing and Self-Managing.

DDBS 500 and cluster nodes 508 A-N can be self-healing. If a node fails, requests can be set to automatically fail-over. When a node fails or a new node is added, the cluster automatically re-balances and migrates data. The cluster can be resilient in the event of node failure during re-balancing itself. If a cluster node receives a request for a piece of data that it does not have locally, it can satisfy the request by creating an internal proxy for this request, fetching the data from the real owner using the internal cluster interconnect, and subsequently replying to the client directly. Adding capacity can include installing and/or configuring a new server and cluster nodes 508 A-N can automatically discover the new node and re-balances data (e.g. using a Paxos consensus algorithm).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method of a distributed database system comprising:
    detecting that a database node departed from a database cluster;
    implementing a consensus-based voting process utilizing all of a set of other database nodes remaining in the database cluster;
    determining a cluster configuration, with the consensus-based voting process, wherein the cluster configuration comprises a new list of the set of other database nodes remaining in the database cluster; and
    automatically rebalancing data among the set of other database nodes remaining in the database cluster according to the cluster configuration.

2. The method of claim 1, wherein the consensus-based voting process comprises a Paxos algorithm.

3. The method of claim 2, wherein the database cluster comprises a Not-Only Structured Query Language (NOSQL) distributed database cluster.

4. The method claim 3, wherein the database node includes a persistent unique identifier that the database node periodically transmits to the set of other database nodes.

5. The method of claim 4, wherein determining that the database node has departed from a database cluster further comprises:
    monitoring, with the set of other database nodes, a departure of the persistent unique identifier from the database node; and
    automatically determining that the database node has departed from the database cluster when the persistent unique identifier is no longer received by the set of other database nodes.

6. The method of claim 5 further comprising:
    automatically determining that a new database node has arrived when a new persistent unique identifier is received by the set of other database nodes.

7. The method of claim 6, wherein the Paxos algorithm comprises:
    automatically electing a principal node with votes by all members of the set of other database nodes remaining in the database cluster;
    utilizing a multi-phase commit process with the principal database node to determine the state of the set of other database nodes, and wherein the principal node communicates a request to the other members of the set of other database nodes to return a commit transaction back to the principal node;
    detecting a commit transaction in response to the principal database node's request from the other members of the set of other database nodes; and
    including each database node that communicates the commit transactions in a new database cluster, wherein the Paxos algorithm is used to generate a list member nodes of the new database cluster.

8. The method of claim 2, wherein a set of instructions for the consensus-based voting process are present in each database node of the database cluster.

9. A computerized system comprising:
    a processor configured to execute instructions;
    a memory containing instructions when executed on the processor, causes the processor to perform operations that:
        detect a change to the number of database nodes a database cluster;
        implement consensus-based voting process utilizing all of a set of database nodes in the database cluster;
        determine a cluster configuration, with the consensus-based voting process, wherein the cluster configuration comprises a new list of the set of database nodes in the database cluster.

10. The computerized system of claim 9, wherein the wherein the consensus-based voting process comprises a Paxos algorithm.

11. The computerized system of claim 10, wherein the database cluster comprises a Not-Only SQL (NOSQL) distributed database cluster.

12. The computerized system of claim 11, wherein the memory containing instructions when executed on the processor, causes the processor to perform operations that:
    automatically elect a principal node with votes by all members of the set of database nodes in the database cluster.

13. The computerized system of claim 12, wherein the memory containing instructions when executed on the processor, causes the processor to perform operations that:
    utilize a multi-phase commit process with the principal database node to determine the state of the set of database nodes, and wherein the principal node communicates a request to the other members of the set of database nodes to return a commit transaction back to the principal node.

14. The computerized system of claim 13, wherein the memory containing instructions when executed on the processor, causes the processor to perform operations that:
    detect a commit transaction in response to the principal database node's request from the other members of the set of database nodes.

15. The computerized system of claim 14, wherein the memory containing instructions when executed on the processor, causes the processor to perform operations that:
    include each database node that communicates the commit transactions in a new database cluster, wherein the Paxos algorithm is used to generate a list member nodes of the new database cluster.

16. The computerized system of claim 15, wherein a set of instructions for the consensus-based voting process are present in each database node of the database cluster.

17. The computerized system of claim 16, wherein the memory containing instructions when executed on the processor, causes the processor to perform operations that:
    automatically rebalance data among the set of database nodes in the new database cluster according to the cluster configuration.

* * * * *